(12) United States Patent
Datars et al.

(10) Patent No.: US 8,510,232 B2
(45) Date of Patent: Aug. 13, 2013

(54) SYSTEM AND METHOD FOR SHARING INFORMATION

(75) Inventors: Andrew Datars, Mississauga (CA); Julia Staffen, Oakville (CA)

(73) Assignee: Empathica Inc., Mississauga (CA)

( * ) Notice: Subject to any disclaimer, the term of this patent is extended or adjusted under 35 U.S.C. 154(b) by 489 days.

(21) Appl. No.: 12/760,231

(22) Filed: Apr. 14, 2010

(65) Prior Publication Data

US 2011/0258131 A1    Oct. 20, 2011

(51) Int. Cl.
  G06Q 30/02    (2012.01)
  G06Q 10/06    (2012.01)
  G06Q 30/06    (2012.01)
  G06Q 10/10    (2012.01)
  G06Q 10/08    (2012.01)
(52) U.S. Cl.
  USPC ............................................ 705/347; 705/1.1

(58) Field of Classification Search
  None
  See application file for complete search history.

(56) References Cited

U.S. PATENT DOCUMENTS

| | | | | |
|---|---|---|---|---|
| 7,783,710 | B2 * | 8/2010 | Ramaswamy | 709/206 |
| 2006/0235873 | A1 * | 10/2006 | Thomas | 707/102 |
| 2009/0271289 | A1 * | 10/2009 | Klinger et al. | 705/26 |
| 2011/0211813 | A1 * | 9/2011 | Marks | 386/297 |

* cited by examiner

Primary Examiner — Jonathan Ouellette
(74) Attorney, Agent, or Firm — Aaron Edgar; Gowling Lafleur Henderson LLP

(57) ABSTRACT

A method is provided for recommending a product to a plurality of people. The method comprises the following steps. A consumer is provided with an entry point to recommend the product. The consumer is then provided with at least one applet configured for a corresponding social network. The applet is used to create a custom recommendation personalized by the consumer, and disseminate the custom recommendation amongst the consumer's contacts within the social network. A computer readable medium including instructions for implementing the method is also provided.

16 Claims, 5 Drawing Sheets

SYSTEM AND METHOD FOR SHARING INFORMATION

The present invention relates to a system and method for sharing information and specifically to a system and method for sharing information using social media.

BACKGROUND

Social media is media designed to be disseminated through social interaction, created using highly accessible and scalable publishing techniques. Social media uses Internet and web-based technologies to transform traditional broadcast media monologues (one to many) into social media dialogues (many to many). Examples of some popular social media include social networks such as Facebook, Twitter, MySpace, Friendster, LinkedIn and the like.

Accordingly, in recent years social media have grown exponentially. Their popularity is, at least in part, related to the fact they are fast, condensed and often highly interesting in content. This growth has increased the number of consumers that producers are able to reach. Accordingly, social media has become the new "tool" for effective business marketing and sales. However, it continues to be a challenge for companies to efficiently leverage this new market into improved sales.

SUMMARY

In accordance with an aspect of the present invention there is provided a method for recommending a product to a plurality of people, the method comprising the steps of: in response to interaction with product, providing a consumer with an entry point to recommend the product; providing the consumer with at least one applet configured for a corresponding social network; and using the applet to: create a custom recommendation personalized by the consumer; and disseminate the custom recommendation amongst the consumer's contacts within the social network.

In accordance with a further aspect of the present invention, there is provided a computer readable medium having stored thereon instructions to execute the method.

BRIEF DESCRIPTION OF THE DRAWINGS

An embodiment of the present invention will now be described by way of example only with reference to the following drawings in which.

DETAILED DESCRIPTION OF THE PREFERRED EMBODIMENTS

Figure 1:
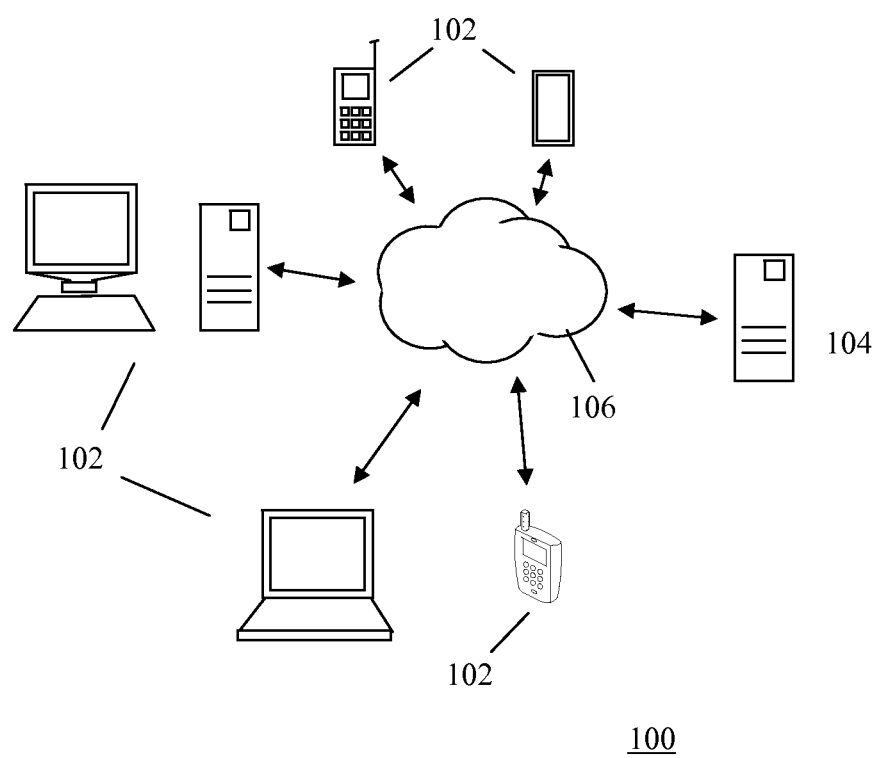
FIG. 1 is block diagram of a network infrastructure (prior art)

For convenience, like numerals in the description refer to like structures in the drawings. Referring to FIG. 1, typical communication infrastructure is illustrated generally by numeral 100. The communication infrastructure 100 includes a plurality of client devices 102 and servers 104 capable of communicating with each other via a communication network 106. The client devices 102 can be any one of a number of different computing devices, such as a personal computer, notebook computer, tablet computer, as well as more mobile computing devices such as a personal digital assistant, smart phone, cellular phone and the like, The communication network 106 can be a public network such as the Internet or a private network such as an intranet. The client devices 102 and servers 104 are connected to the communication via any one of a plurality of different wired or wireless technologies. Users of the client devices 102 can use the client devices 102 to access social media sites, often hosted on one or more of the servers 104. Accordingly, the users can be in constant interaction with the social media sites.

The growth and accessibility of social media has profound implications for brands as they develop their marketing plans. The rapid growth of social networking sites, as well as the proliferation of client devices 102, has also greatly increased the ability for consumers to reach out to large group of their friends quickly and efficiently, regardless of their geographic location.

In the past, if a consumer had a positive or a negative brand experience it would have taken days or even weeks to communicate this to their friends and family as it would have to have been done via telephone, electronic mail (e-mail), during face-to-face conversations and the like. Further, because of the one-to-one communications in the old world, the message would have likely gone out to a small subset of their community and often only when asked directly. It would have to be a truly exceptionally experience, positive or negative, to result in a broadcast to their entire social network as the message or story would need to be repeated time and time again.

With social networking sites, such as Facebook for example, the process of sharing is easy and the consumer habit of going on the sites to tell people about their brand experiences is becoming well-established. This represents a tremendous opportunity and threat for brand owners.

Accordingly, to take advantage of this opportunity and enable brands to leverage the power of positive recommendations from their customers, recommendation software is provided. As will be described the recommendation is triggered in response to a survey. That is, upon completion of a survey, such as a customer satisfaction survey, the recommendation software determines whether or not to provide a respondent with an option to recommend a product. For the purpose of this description, the term "product" is used to refer to a service, brand, experience and/or merchandise.

Figure 2:
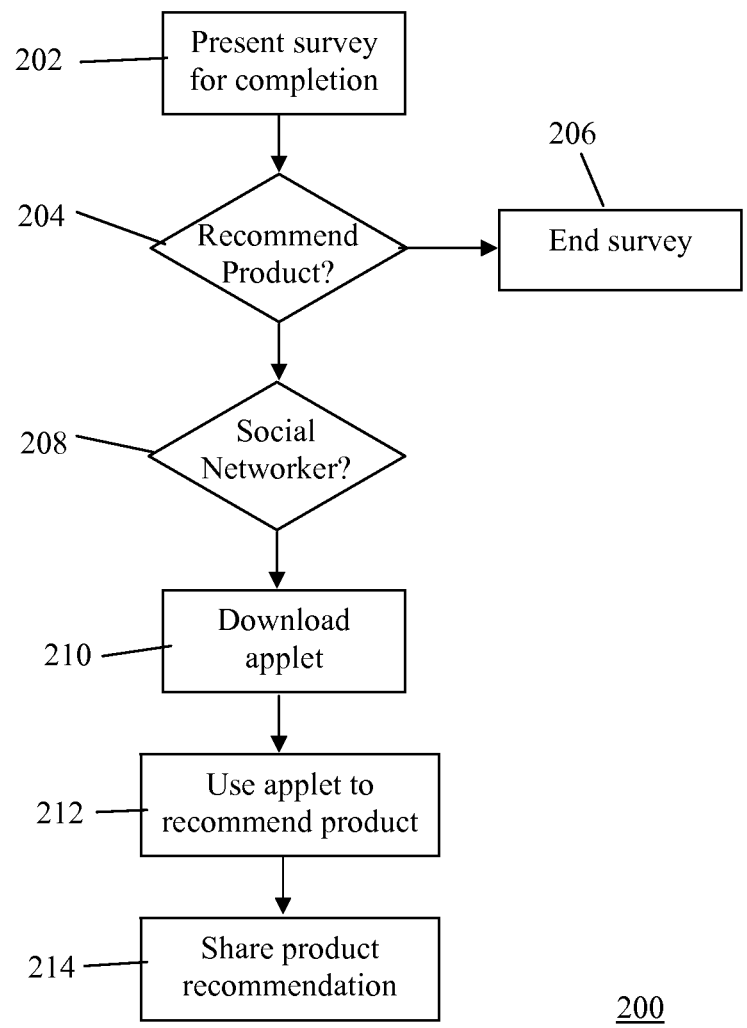
FIG. 2 is a flow chart illustrating a method for recommending a product.

Referring to FIG. 2, a flow chart illustrating the operation of an improved method for recommending a product is illustrated generally by numeral 200. At step 202, an online survey for a product is presented to a respondent for completion. The online survey includes questions for collecting information as determined by the product manufacturer, marketer or reseller, for example.

At step 204, based on the online survey, recommendation software determines whether or not the respondent will recommend the product. The recommendation is based on a comparison with a recommendation threshold. If the survey results meet or exceed the recommendation threshold then it is likely that the respondent will recommend the product. As will be appreciated by a person of ordinary skill in the art, the recommendation threshold can vary depending on the implementation.

In the present embodiment, this determination is made explicitly by directly asking the respondent whether or not they are likely to recommend the product. The respondent can be provided with a number of varying scales for answering the question. For example, the respondent can be provided with a "yes" or "no" option to indicate whether or not they would recommend the product. In this example, the recommendation threshold would be a "yes" answer.

In another example, the respondent can be provided with a option to rank how likely s/he would be to recommend the product on a scale of one to a maximum value (x). Usually, x is five or ten. In this example, the recommendation threshold is at least three-out-of-five or seven-out-of-ten.

In an alternate embodiment, this determination can be made implicitly based on the questions asked in the survey. That is, although the respondent will not be asked directly whether or not s/he would recommend the product, the determination can be made based on an analysis of response to other questions in the survey. In this embodiment, the recommendation threshold is compared to a mathematical manipulation of at least some of the survey questions.

If the survey results fail to meet the recommendation threshold, the recommendation software continues at step 206. At step 206 the survey terminates by closing a survey window, redirecting to a predetermined website, or in any other manner for completing a traditional online survey.

If the survey results meet or exceed the recommendation threshold, the recommendation software continues at step 208. Implementing such a qualification process helps develop reliable metrics on conversion rates. At step 208 the respondent is asked if they participate in one or more social networking sites. If the respondent does not participate in any of the social networking sites, then the recommendation application continues to step 206.

If the respondent does participate in any of the social networking sites, then the recommendation software continues to step 210. At step 210, the respondent is invited to access an applet for the corresponding social media site. As will be appreciated, the term applet is used in its generic form as any small application that performs a specific task, sometimes running within the context of a larger program. It is not intended to limit the definition to a Java-based applet. The applet is configured to execute within an environment provided by the corresponding social networking site. The applet is further configured to provide the respondent with a customizable interface to recommend the product.

In the present embodiment, the respondent selects a single social network and accesses a corresponding applet. In an alternate embodiment, the respondent may select a plurality of different social networks and access a plurality of corresponding applets.

At step 212, the respondent uses the applet to recommend the product and, at step 214, the recommendation is dissemination amongst the respondent's contacts on the social networking site.

In an alternate embodiment, the survey may be conducted by a third party, with only the relevant information being passed to the recommendation software. In one example, the relevant information could be responses to predetermined questions, in which case the recommendation software would determine whether or not to proceed with the recommendation. In another example, the third party could determine whether or not to proceed with the recommendation, in which case the relevant information could be the relevant social networking information.

Figure 3:
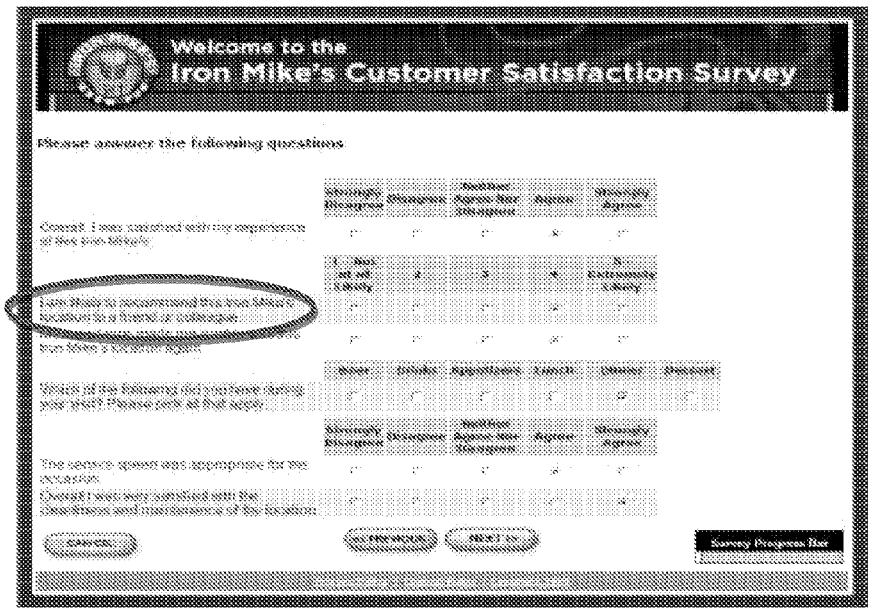
FIG. 3 is a screenshot of an online survey for completion by a respondent.
Figure 4:
FIG. 4 is a screenshot of an applet retrieval page.

A sample implementation of the recommendation software and applet is described as follows. In this example, the product is a restaurant called Iron Mike's Brew Pub. At step 202 the respondent completes a consumer survey, as illustrated in FIG. 3. At step 204 it is determined that the respondent is likely to recommend the product. Accordingly, at step 208, the respondent is queried to determine if s/he has a Facebook account. Once it is determined that the respondent has a Facebook account, then at step 210, the respondent is provided with the opportunity to access a corresponding Facebook applet, as illustrated in FIG. 4.

Figure 5:
FIG. 5 is a screenshot of recommendation customization of the applet.

At step 212, the respondent can customize the recommendation by adding personal comments regarding the product. In the present embodiment, the respondent comments on why she likes Iron Mike's Brew Pub, as shown in FIG. 5.

Figure 6A:
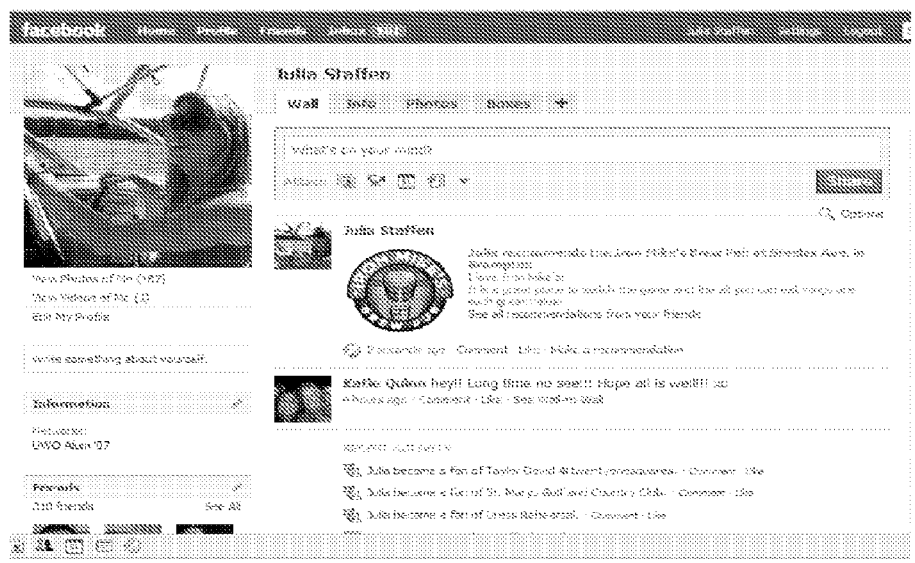
FIG. 6a is a screenshot of the respondent's profile page.
Figure 6B:
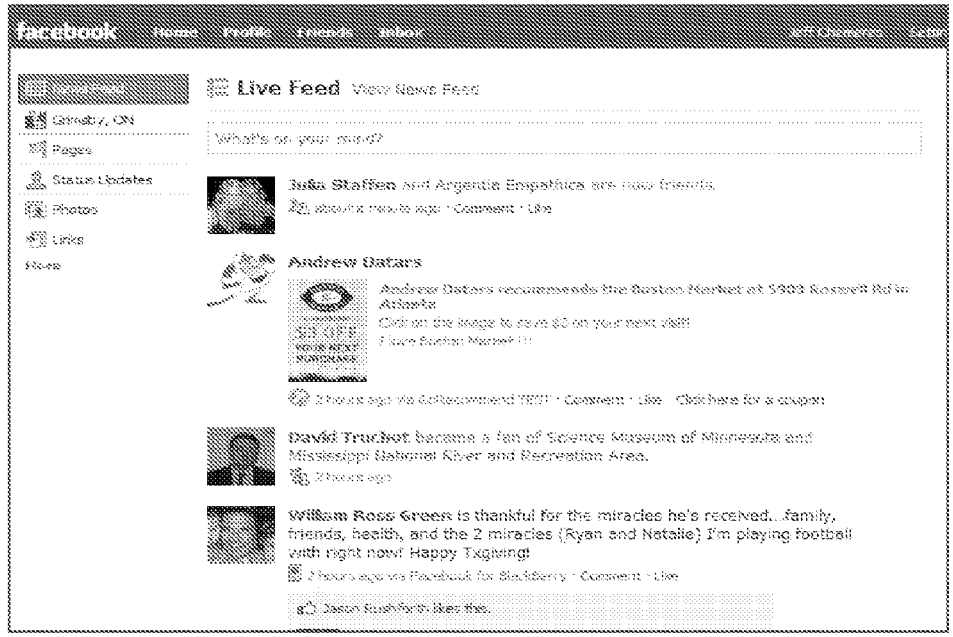
FIG. 6b is a screenshot of the respondent's friend's news feed.
Figure 6C:
FIG. 6c is a screenshot of a brand's fan page.

At step 214, the applet disseminates the recommendations to all of the respondents friends on Facebook. This is achieved by posting the recommendation to the respondent's profile page, as shown in FIG. 6a. Items posts to the respondent's profile page using Facebook may be viewed by all of the respondent's friends. The recommendation is also posted to the respondent's friends' news feed, as shown in FIG. 6b. Lastly, the recommendation is also posted to a brand's fan page. For example, Iron Mike's Brew Pub has an established fan page on Facebook and the recommendation by the respondent is posted on the fan page, as shown in FIG. 6c. The respondent may also be provided with an option to receive further product information. This includes, for example, signing up to an e-mail distribution list, becoming a fan of the brand on the fan page and the like. In this way, the respondent can be notified of any upcoming promotions or campaigns for the product.

The embodiment described above relates specifically to a recommendation that has an entry point in response to a product survey. In an alternate embodiment, a direct entry point to recommend the product is provided to the consumer. The direct entry point can be made after any interaction with the web site related to the product, such as a contest site, for example. Alternately, the direct entry point can result from in-store promotion, mail and e-mail promotion, or physical media (such as newspaper or magazine) promotion.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and/or "application" as used herein are intended to encompass a computer program existent (permanently, temporarily, or transitorily) on any computer-usable medium such as on any memory device or in any transmitting device.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

We claim:

1. A method for recommending a product to a plurality of people, the method comprising the steps of:
    providing a consumer with an online survey to collect information about the product;
    comparing answers for at least one of a plurality of questions in the online survey with a recommendation threshold to determine whether the consumer is likely to recommend the product;
    providing the consumer with at least one applet configured for a corresponding social network only if it is determined that the consumer is likely to recommend the product; and
    using the applet to:
        create a custom recommendation personalized by the consumer; and
        disseminate the custom recommendation amongst the consumer's contacts within the social network.

2. The method of claim 1, wherein the online survey includes at least one question explicitly asking if the consumer would recommend the product and the consumer is provided with a corresponding plurality of possible answers.

3. The method of claim 2, wherein the plurality of possible answers includes two answers, a yes option and a no option, and the recommendation threshold is the yes option.

4. The method of claim 2, wherein the plurality of possible answers includes more than two possible answers on a scale of one to a maximum value and the threshold is close to the maximum value.

5. The method of claim 1, wherein the online survey includes a plurality of questions implicitly asking if the consumer would recommend the product and the recommendation threshold is compared to a mathematical manipulation of the answers to the least one of the plurality of questions in the online survey.

6. The method of claim 1 comprising the further step of providing the consumer with a plurality of social networks for selection by the consumer, wherein each social network has a corresponding applet available.

7. The method of claim 1, wherein the online survey is a direct entry point selectable by a user during interaction with the web site relating to the product.

8. The method of claim 7, wherein the web site is a contest web site.

9. A non-transitory computer readable medium having stored thereon instructions for recommending a product to a plurality of people, the instructions, when executed by a processor configured to implement the steps of:
    providing a consumer with an online survey to collect information about the product;
    comparing answers for at least one of a plurality of questions in the online survey with a recommendation threshold to determine whether the consumer is likely to recommend the product;
    providing the consumer with at least one applet configured for a corresponding social network only if it is determined that the consumer is likely to recommend the product; and
    using the applet to:
        create a custom recommendation personalized by the consumer; and
        disseminate the custom recommendation amongst the consumer's contacts within the social network.

10. The computer readable medium of claim 9, wherein the online survey includes at least one question explicitly asking if the consumer would recommend the product and the consumer is provided with a corresponding plurality of possible answers.

11. The computer readable medium of claim 10, wherein the plurality of possible answers includes two answers, a yes option and a no option, and the recommendation threshold is the yes option.

12. The computer readable medium of claim 10, wherein the plurality of possible answers includes more than two possible answers on a scale of one to a maximum value and the threshold is close to the maximum value.

13. The computer readable medium of claim 9, wherein the online survey includes a plurality of questions implicitly asking if the consumer would recommend the product and the recommendation threshold is compared to a mathematical manipulation of the answers to the least one of the plurality of questions in the online survey.

14. The computer readable medium of claim 9, comprising further instructions for providing the consumer with a plurality of social networks for selection by the consumer, wherein each social network has a corresponding applet available.

15. The computer readable medium of claim 9, wherein the online survey is a direct entry point selectable by a user during interaction with a web site relating to the product.

16. The computer readable medium of claim 15, wherein the web site is a contest web site.

* * * * *